(12) United States Patent
Ikuno

(10) Patent No.: US 8,796,396 B2
(45) Date of Patent: Aug. 5, 2014

(54) POLYLACTIC ACID, RESIN COMPOSITION, AND RESIN MOLDED PRODUCT

(71) Applicant: Fuji Xerox Co., Ltd., Tokyo (JP)

(72) Inventor: Masaya Ikuno, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/779,081

(22) Filed: Feb. 27, 2013

(65) Prior Publication Data

US 2014/0073747 A1    Mar. 13, 2014

(30) Foreign Application Priority Data

Sep. 11, 2012  (JP) ................................. 2012-199501

(51) Int. Cl.
*C08G 63/08*    (2006.01)

(52) U.S. Cl.
USPC ........... 525/450; 525/410; 525/415; 525/538; 528/361; 528/398

(58) Field of Classification Search
USPC ........... 525/410, 415, 450, 538; 528/361, 398
See application file for complete search history.

(56) References Cited

U.S. PATENT DOCUMENTS

| | | | | |
|---|---|---|---|---|
| 5,942,584 A | * | 8/1999 | von Gentzkow | 525/419 |
| 7,879,954 B2 | * | 2/2011 | Yao et al. | 525/450 |
| 2010/0130651 A1 | * | 5/2010 | Fukawa et al. | 524/88 |
| 2011/0207867 A1 | | 8/2011 | Yao et al. | |

FOREIGN PATENT DOCUMENTS

| | | |
|---|---|---|
| JP | A-2008-174680 | 7/2008 |
| JP | A-2009-191220 | 8/2009 |
| JP | A-2009-227784 | 10/2009 |
| JP | A-2011-173996 | 9/2011 |

\* cited by examiner

*Primary Examiner* — Robert Jones, Jr.
(74) *Attorney, Agent, or Firm* — Oliff PLC

(57) ABSTRACT

A polylactic acid has a terminal-modified structure represented by the following formula (1):

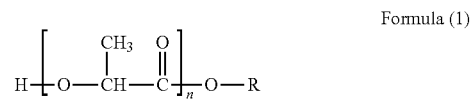

Formula (1)

wherein in the formula (1), R represents a residue of an organic phosphorus compound containing an epoxy group, and n represents an integer from 100 to 5000.

16 Claims, 2 Drawing Sheets

IR SPECTRUM OF UNMODIFIED POLYLACTIC ACID

IR SPECTRUM OF MODIFIED POLYLACTIC ACID (POLYLACTIC ACID AFTER REACTION WITH REACTIVE ORGANIC PHOSPHORUS COMPOUND)

POLYLACTIC ACID, RESIN COMPOSITION, AND RESIN MOLDED PRODUCT

CROSS-REFERENCE TO RELATED APPLICATIONS

This application is based on and claims priority under 35 USC 119 from Japanese Patent Application No. 2012-199501 filed Sep. 11, 2012.

BACKGROUND

1. Technical Field

The present invention relates to a polylactic acid, a resin composition, and a resin molded product.

2. Related Art

In the related art, various resin compositions have been provided and used in a variety of applications. In particular, resin compositions have been employed in various parts, housings, or the like of domestic appliances or automobiles as well as parts of housings or the like of office machines or electric/electronic appliances.

SUMMARY

According to an aspect of the invention, there is provided a polylactic acid having a terminal-modified structure represented by the following formula (1):

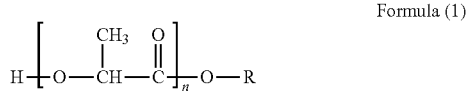

Formula (1)

wherein in the formula (1), R represents a residue of an organic phosphorus compound containing an epoxy group, and n represents an integer of from 100 to 5000.

BRIEF DESCRIPTION OF THE DRAWINGS

Exemplary embodiments of the present invention will be described in detail based on the following figures, wherein:

FIGS. 1A and 1B are charts showing the IR spectrum of the polylactic acid of Example 1, in which FIG. 1A is a chart showing the IR spectrum of an unmodified polylactic acid and FIG. 1B is a chart showing the IR spectrum of a modified polylactic acid (polylactic acid after the reaction with a reactive organic phosphorus compound).

DETAILED DESCRIPTION

Figure 1A:
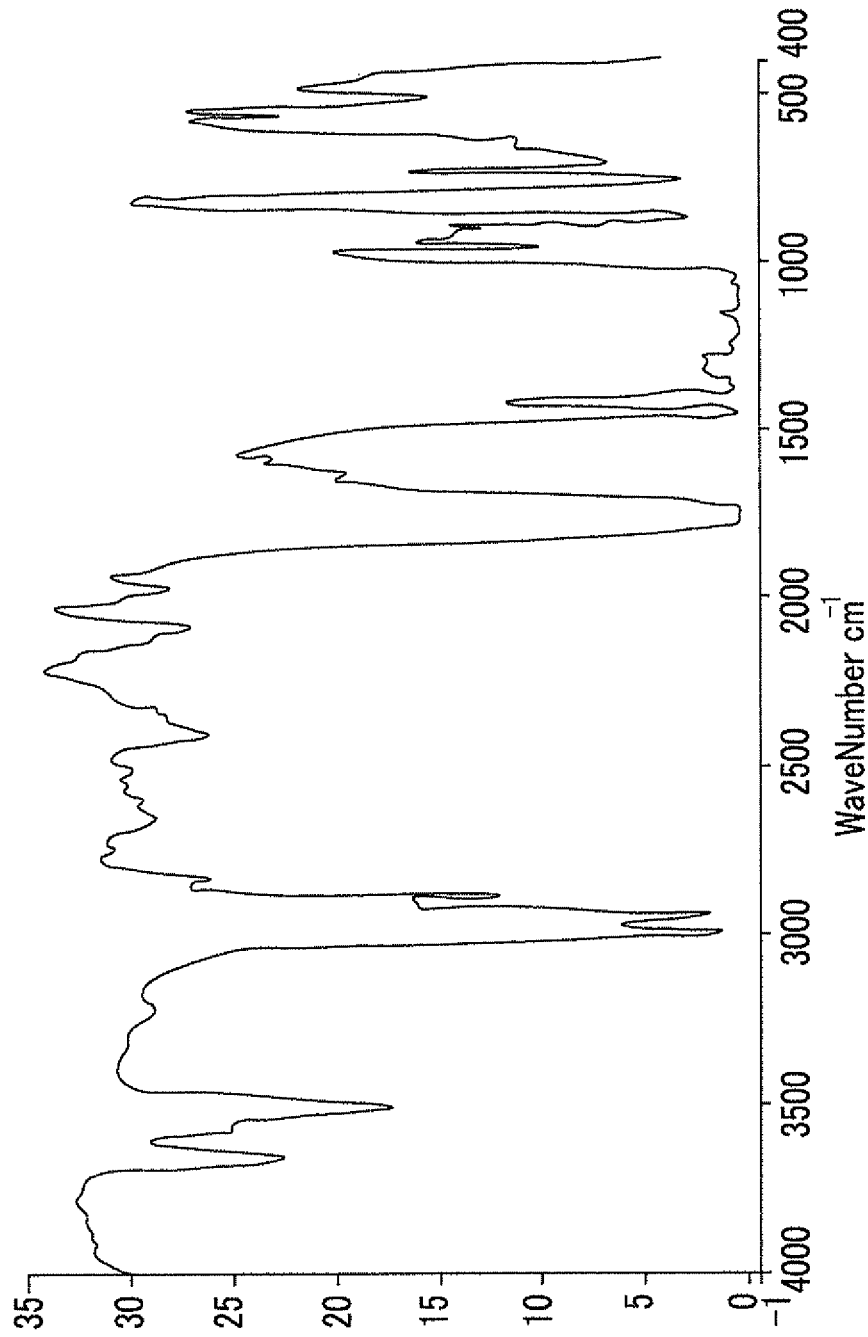

Hereinbelow, exemplary embodiments which are examples of the invention will be described in detail.

Polylactic Acid

The polylactic acid according to the present exemplary embodiment is a polylactic acid having a terminal-modified structure represented by the formula (1)

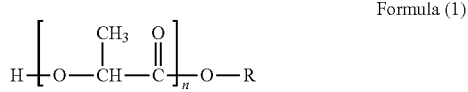

Formula (1)

In the formula (1), R represents a residue of an organic phosphorus compound containing an epoxy group (which is hereinafter referred to as a "reactive organic phosphorus compound").

n represents an integer from 100 to 5000 (preferably an integer from 500 to 3000).

In this regard, in the related art, a polylactic acid has been known as a resin raw material for a resin molded product. The polylactic acid is derived from plants and is a resin which is preferable in terms of reduction in an environment load (specifically reduction in the amount of $CO_2$ discharged, or reduction in the amount of petroleum used).

On the other hand, it is known that an organic phosphorus compound is added as a flame retardant to a polylactic acid for the purpose of imparting a resin molded product including the polylactic acid with flame retardancy. Further, it is also known that a compound containing an epoxy group is reacted with a polylactic acid to improve the mechanical strength of a resin molded product.

However, it is found that by providing the polylactic acid according to the present exemplary embodiment with a terminal-modified structure represented by the formula (1), the flame retardancy of a resin molded product that is obtained is improved, as compared with a case where an organic phosphorus compound is simply added to the polylactic acid.

The reason therefor is not clear, but it is thought that a terminal carboxyl group of the polylactic acid is bonded to a reactive organic phosphorus compound to inhibit the polylactic acid from decomposition during combustion with the terminal group of the polylactic acid.

In addition, it is thought that by providing a polylactic acid with a terminal-modified structure represented by the formula (1), the flame retardancy of a resin molded product obtained is improved with a small amount of the reactive organic phosphorus compound, as compared with a case where an organic phosphorus compound is added as a flame retardant.

Hereinbelow, the polylactic acid according to the present exemplary embodiment will be described in detail.

The polylactic acid according to the present exemplary embodiment is a polylactic acid having a terminal-modified structure represented by the formula (1).

Specifically, the polylactic acid according to the present exemplary embodiment is, for example, a reaction product of a polylactic acid (terminal-unmodified polylactic acid) with a reactive organic phosphorus compound, or a polylactic acid obtained by mixing the reaction product with a polylactic acid (terminal-unmodified polylactic acid).

That is, the polylactic acid according to the present exemplary embodiment is, for example, a polylactic acid having all or a part of its terminal carboxyl groups modified by a reactive organic phosphorus compound.

In this regard, for the polylactic acid according to the present exemplary embodiment, the terminal modification rate (modification rate of the terminal carboxyl group by a reactive organic phosphorus compound) may be 50% or more, preferably 70% or more, and more preferably 80% or more, from the viewpoint of improvement of flame retardancy.

Moreover, the upper limit of the terminal modification rate is theoretically 100% (that is, all of the polylactic acid according to the present exemplary embodiment is composed of the terminal-modified polylactic acid represented by the formula (1)).

This terminal modification rate is calculated as a terminal modification rate (B-A/B) by determining the terminal carboxyl group concentration A of the polylactic acid after the reaction and the terminal carboxyl group concentration B of the polylactic acid before the reaction, through the measurement of acid values.

Specifically, 1 g of a polylactic acid is dissolved in 200 ml of a chloroform/ethanol solution, and the solution thus dissolved is subjected to neutralization titration with a potassium hydroxide/ethanol solution. Based on the measured acid value obtained in accordance to the measurement, ((the measured acid value (KOH mg/g) of the polylactic acid before the reaction)−(the measured acid value (KOH mg/g) of the polylactic acid after the reaction)/(the measured acid value (KOH mg/g) of the polylactic acid before the reaction)×100(%) is taken as a terminal modification rate.

For the polylactic acid according to the present exemplary embodiment, the polylactic acid (terminal-unmodified polylactic acid) is not particularly limited as long as it is a condensate of lactic acid, and it may have at least a carboxyl group on a terminal of a polymer chain (that is, a terminal of a main chain). The polylactic acid may be either an L-form or a D-form, or a mixture thereof (for example, a stereocomplex formed by mixing poly-L lactic acids and poly-D lactic acids, or a polylactic acid containing both of an L-lactic acid block and a D-lactic acid block in the structure).

As the polylactic acid, a synthesized polylactic acid or a commercially available product may be used. Examples of the commercially available product include TE7000 and TE2000, both manufactured by Unitika Ltd., 4032D, 3001D, 3052D, and 3801D, all manufactured by NatureWorks L.L.C., and LACEA H100 manufactured by Mitsui Chemicals, Inc.

The weight-average molecular weight of the polylactic acid is, for example, from 30000 to 300000, and preferably from 50000 to 200000.

Further, the weight-average molecular weight is measured by means of gel permeation chromatography (GPC). For the measurement of the molecular weight by means of GPC, HLC-8320 GPC manufactured by Tosoh Corporation is used as a measurement device, Column TSKgel GMHHR-M+ TSKgel GMHHR-M (7.8 mm I. D. 30 cm) manufactured by Tosoh Corporation is used, and chloroform is used as a solvent. The weight-average molecular weight is calculated using a molecular weight calibration curve prepared with a monodisperse polystyrene standard sample from the measurement values. For the measurement of the weight-average molecular weight, the same shall apply hereinafter.

On the other hand, examples of the reactive organic phosphorus compound include at least one selected from a phosphine oxide compound, a phosphinate compound, a phosphonate compound, and a phosphite compound.

Specific examples thereof include reactive organic phosphorus compounds represented by the following formulae (1-1) to (1-4).

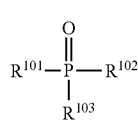

Formula (1-1)

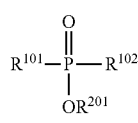

Formula (1-2)

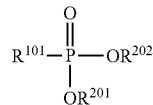

Formula (1-3)

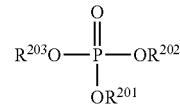

Formula (1-4)

In the formulae (1-1) to (1-4), $R^{101}$, $R^{102}$, $R^{103}$, $R^{201}$, $R^{202}$, and $R^{203}$ each independently represent an alkyl group or an aryl group.

However, in the formula (1-1), one of $R^{101}$, $R^{102}$, and $R^{103}$ represents a group containing an epoxy group. At least two of $R^{101}$, $R^{102}$, and $R^{103}$ may be linked to each other.

In the formula (1-2), one of $R^{101}$, $R^{102}$, and $R^{201}$ represents a group containing an epoxy group. At least two of $R^{101}$, $R^{102}$ and $R^{201}$ may be linked to each other.

In the formula (1-3), one of $R^{101}$, $R^{201}$, and $R^{202}$ represents a group containing an epoxy group. At least two of $R^{101}$, $R^{201}$, and $R^{202}$ may be linked to each other.

In the formula (1-4), one of $R^{201}$, $R^{202}$, and $R^{203}$ represents a group containing an epoxy group. At least two of $R^{201}$, $R^{202}$, and $R^{203}$ may be linked to each other.

In the formulae (1-1) to (1-4), the alkyl group, which may be represented by each of the symbols, may be a linear or branched alkyl group having 1 to 10 carbon atoms (preferably 1 to 5 carbon atoms), and specific examples thereof include a methyl group, an ethyl group, a propyl group, a butyl group, a pentyl group, a hexyl group, a heptyl group, an octyl group, a nonyl group, and a decyl group.

In the formulae (1-1) to (1-4), examples of the aryl group, which may be represented by each of the symbols, include a phenyl group, a benzyl group, and a tolyl group.

In the formulae (1-1) to (1-4), examples of the group containing an epoxy group, which may be represented by each of the symbols, include an epoxyalkyl group (an epoxy group-substituted alkyl group), an epoxyalkenyl group (an epoxy group-substituted alkenyl group), an arylepoxyalkyl group (an arylalkyl group having an epoxy group substituted at an alkyl moiety), an glycidyloxyalkyl group (a glycidyloxy group-substituted alkyl group), and an epoxycyclohexyl group-substituted alkyl group.

For the group containing an epoxy group, the number of carbon atoms in the alkyl moiety may be, for example, from 1 to 10, preferably from 1 to 5. Further, examples of the aryl moiety include a phenyl group and a benzyl group.

Here, it is preferable that the reactive organic phosphorus compound have, for example, an aromatic ring structure, from the viewpoint of improvement of flame retardancy.

Specifically, for example, in the formula (1-1), one of $R^{101}$, $R^{102}$, and $R^{103}$ may represent a group containing an epoxy group and an aryl group, or an aryl group.

In the formula (1-2), one of $R^{101}$, $R^{102}$, and $R^{201}$ may represent an aryl group.

In the formula (1-3), one of $R^{101}$, $R^{201}$, and $R^{202}$ may represent an aryl group.

In the formula (1-4), one of $R^{201}$, $R^{202}$, and $R^{203}$ represent an aryl group.

In addition, the group containing an epoxy group may contain an aryl group.

Specific examples of the reactive organic phosphorus compound are shown below, but the invention is not limited thereto.

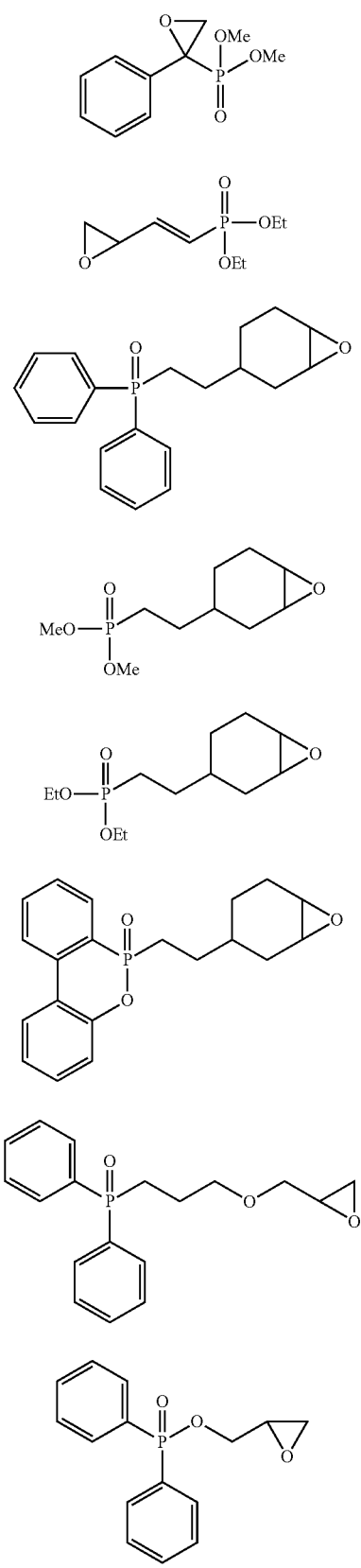
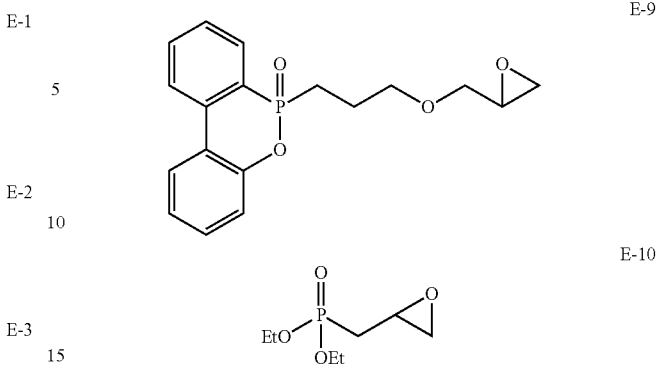

The addition amount of the reactive organic phosphorus compound may be for example, an amount such that the terminal modification rate of the polylactic acid according to the present exemplary embodiment is in the above-described range, and may be, for example, 0.5 part by weight or more, preferably 1 part by weight or more, more preferably 2 parts by weight or more, and still more preferably 5 parts by weight or more, based on 100 parts by weight of the polylactic acid (terminal-unmodified polylactic acid).

Resin Composition

The resin composition according to the present exemplary embodiment is configured to include the polylactic acid according to the present exemplary embodiment.

In this regard, the resin composition according to the present exemplary embodiment may be configured to include a polylactic acid (terminal-unmodified polylactic acid) and a reactive organic phosphorus compound (organic phosphorus compound containing an epoxy group). This is due to a fact that these compounds undergo a reaction because of heat during the molding of a resin molded product, or the like, so as to form the polylactic acid according to the present exemplary embodiment, and thus compose the resin molded product. Further, the content of the polylactic acid (terminal-unmodified polylactic acid) and the reactive organic phosphorus compound may be an amount such that the terminal modification rate of the polylactic acid according to the present exemplary embodiment is in the above-described range, and may be specifically the above-described addition amount.

The resin composition according to the present exemplary embodiment may use other resins, in addition to the polylactic acid according to the present exemplary embodiment, within a range not interfering with the effects.

Examples of such other resins include known thermoplastic resins, and specifically, aliphatic polyesters other than polylactic acids, polycarbonate resins, acrylonitrile/butadiene/styrene resins, polypropylene resins, polyamide resins, aromatic polyester resins, polyolefin resins, polyester carbonate resins, polyphenylene ether resins, polyphenylene sulfide resins, polysulfone resins, polyether sulfone resins, polyarylene resins, polyetherimide resins, polyacetal resins, polyvinylacetal resins, polyketone resins, polyether ketone resins, polyether ether ketone resins, polyarylketone resins, polyethernitrile resins, liquid crystal resins, polybenzimidazole resins, polyparabanic acid resins, vinyl-based polymer or copolymer resins obtained by polymerizing or copolymerizing at least one kind of vinyl monomers selected from aromatic alkenyl compounds, methacrylic acid esters, acrylic esters, and vinyl cyanide compounds, diene-aromatic alkenyl compound copolymer resins, vinyl cyanide-diene-aromatic alkenyl compound copolymer resins, aromatic alkenyl compound-diene-vinyl cyanide-N-phenylmaleimide copolymer resins, vinyl cyanide-(ethylene-diene-propylene (EPDM))-aromatic alkenyl compound copolymer resins, polyolefins, vinyl chloride resins, and chlorinated vinyl resins. Such other resins described above may be used singly or in combination of two or more kinds thereof.

Other additives may be added to the resin composition according to the present exemplary embodiment, if necessary. Examples of such other additives include well-known additives such as a flame retardant, an antioxidant, a reinforcing agent, a compatibilizing agent, a weathering agent, an impact resistance modifier, a filler, and a hydrolysis inhibitor. The contents of these additives may be 5% by weight or less, based on the entire amount of the resin composition.

Preparation of Resin Composition

The resin composition according to the present exemplary embodiment is prepared by kneading the respective components.

This kneading is carried out using, for example, a known kneader such as a biaxial kneader (TEM58SS manufactured by Toshiba Machine Co., Ltd.) and a simple kneader (LABO Plastomill manufactured by Toyo Seiki Co., Ltd.).

In this regard, for the resin composition according to the present exemplary embodiment, the polylactic acid according to the present exemplary embodiment (modified structure of the terminal carboxyl group of the polylactic acid by the organic phosphorus compound) may be formed by, for example, setting the temperature during the kneading to be from 160° C. to 250° C. It is thought that the present temperature range facilitates the reaction between the polylactic acid (terminal-unmodified polylactic acid) and the reactive organic phosphorus compound.

In addition, the polylactic acid according to the present exemplary embodiment (modified structure of the terminal carboxyl group of the polylactic acid by the reactive organic phosphorus compound) may also be formed by setting the temperature during the molding of the resin molded product, not during the preparation of the resin composition according to the present exemplary embodiment, to the above temperature range.

Molded Product

The resin molded product according to the present exemplary embodiment is configured to include the resin composition according to the present exemplary embodiment.

Specifically, the resin molded product according to the present exemplary embodiment is obtained by, for example, molding the resin composition according to the present exemplary embodiment in a molding device. Further, examples of the molding method with a molding device include injection molding, extrusion molding, blow molding, hot press molding, calendar molding, coating molding, cast molding, dipping molding, vacuum molding, and transfer molding.

In this regard, injection molding may also be carried out using a commercially available device such as NEX150 manufactured by Nissei Plastic Industrial Co., Ltd., NEX70000 manufactured by Nissei Plastic Industrial Co., Ltd., and SE50D manufactured by Toshiba Machine Co., Ltd.

At this time, the cylinder temperature is preferably from 170° C. to 280° C., and more preferably from 180° C. to 270° C. Further, the mold temperature is preferably from 40° C. to 110° C., and more preferably from 50° C. to 110° C.

The resin molded product according to the present exemplary embodiment is suitably used in the applications of electronic/electric appliances, domestic appliances, containers, automobile interior materials, or the like. More specifically, it is suitable for housings of domestic appliances, electronic/electric appliances, or the like, various parts or the like, wrapping films, storing cases for CD-ROM, DVD, or the like, dishes, food trays, beverage bottles, chemical wraps, or the like, in particular, for parts of electronic/electric appliances.

In particular, there are many parts of electronic/electric appliances that have complex shapes, which have high weights, and thus require mechanical strength, but such required characteristics are sufficiently satisfied by the resin molded product according to the present exemplary embodiment.

EXAMPLES

Hereinbelow, the invention will be described in detail with reference to Examples, but is not construed to be limited to Examples. Further, "part(s)" and "%" are hereinafter based on weight unless otherwise specified.

Examples 1 to 13 and Comparative Examples 1 to 2

Preparation of Resin Composition

The materials and the raw materials of the compositions shown in Tables 1 to 3 are put into a biaxial kneader (LABO Plastomill manufactured by Toyo Seiki Co., Ltd.), and kneaded at the kneading temperatures shown in Tables 1 to 3 to obtain resin compositions (compounds).

Preparation of a Resin Molded Product (Sample)

Next, the obtained resin composition is subjected to injection extrusion at a cylinder temperature of 200° C. and a mold temperature of 60° C. with an injection molding device (NEX150E, manufactured by Nissei Plastic Industrial Co., Ltd.) to obtain a UL sample for a V test in UL94 (length of 125 mm, width of 13 mm, and thickness of 2.0 mm).

Evaluation

For each of the obtained molded products (samples), the following tests are carried out for evaluation. The results are shown in Tables 1 to 3.

Identification of Polylactic Acids

The identification data (IR information) of the modified polylactic acids which are the raw materials of each of the obtained molded products (samples) are obtained, and thus, it is confirmed that the modified polylactic acid used in each of Examples is a reacted product from the polylactic acid (unmodified polylactic acid) with the reactive organic phosphorus compound.

Figure 1B:
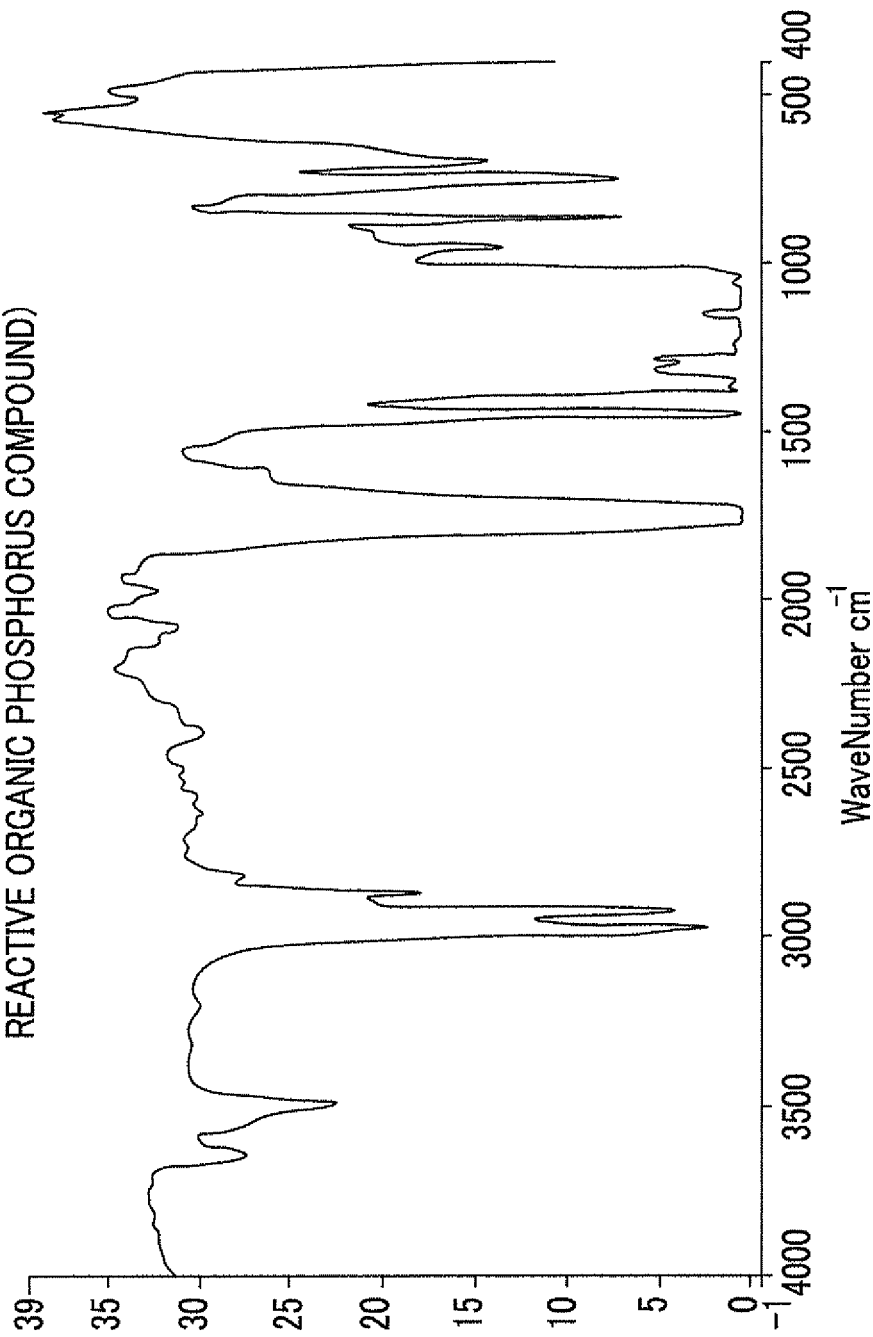

Specifically, for the polylactic acid of Example 1, the IR spectrum of the unmodified polylactic acid (see FIG. 1A) and the IR spectrum of the modified polylactic acid (polylactic acid after the reaction with the reactive organic phosphorus compound) (see FIG. 1B) are measured, and when the spectrum of OH (association) is compared with a standard of the spectrum of carbonyl groups per 1700 $cm^{-1}$, it is found that the modified polylactic acid (polylactic acid after the reaction with the reactive organic phosphorus compound) has a decrease in the OH spectrum derived from the carboxylic acids. From this, it is confirmed that the modified polylactic acid used in Example 1 is a reacted product from the polylactic acid (unmodified polylactic acid) with the reactive organic phosphorus compound.

Moreover, the modified polylactic acid used in each of the other Examples is subjected to IR spectrum measurement in the similar manner, and thus, it is confirmed that the modified polylactic acid is a reacted product from the polylactic acid (unmodified polylactic acid) with the reactive organic phosphorus compound.

Terminal Modification Rate of Polylactic Acid

The terminal modification rate of the modified polylactic acid which is a raw material of each of the obtained molded products (samples) is measured by the above-described method.

Flame Retardancy Test

Using UL samples for a V test in UL-94, a UL-V test is carried out in the method of UL-94. The criteria for the UL-V test are as follows.

V-0: The flame retardancy is highest and there is no occurrence of cotton ignition caused by the flaming droplet.

V-1: The flame retardancy is high following V-0 and there is no occurrence of cotton ignition caused by the flaming droplet.

V-2: The flame retardancy is high following V-1 and there is cotton ignition caused by the flaming droplet.

In addition, in the flame retardancy test, the combustion state is visually observed and evaluated.

TABLE 3

|  |  | Comparative Example 1 | Comparative Example 2 |
|---|---|---|---|
| Polylactic acid (parts by weight) | 3001D | 100 | — |
|  | 4032D | — | 100 |
| Reactive organic phosphorus compound (parts by weight) | E100 | — | — |
|  | E-10 | — | — |
|  | E-1 | — | — |
|  | E-8 | — | — |
|  | E-3 | — | — |
|  | E-4 | — | — |
|  | E-6 | — | — |
|  | E-2 | — | — |
| Other additives (parts by weight) | PX200 | 5 | 10 |
| Kneading temperature ° C. |  | 180 | 180 |
| Terminal modification rate % of polylactic acid |  | 0 | 0 |

TABLE 1

|  |  | Example 1 | Example 2 | Example 3 | Example 4 | Example 5 | Example 6 | Example 7 |
|---|---|---|---|---|---|---|---|---|
| Polylactic acid (parts by weight) | 30.01D | 100 | 100 | 100 | 100 | — | — | 100 |
|  | 4032D | — | — | — | — | 100 | 100 | — |
| Reactive organic phosphorus compound (parts by weight) | E-10 | 2.5 | 5 | — | — | — | — | — |
|  | E-1 | — | — | 2.5 | — | — | — | — |
|  | E-8 | — | — | — | 2 | — | — | — |
|  | E-3 | — | — | — | — | 2 | — | — |
|  | E-4 | — | — | — | — | — | 5 | 5 |
|  | E-6 | — | — | — | — | — | — | — |
|  | E-2 | — | — | — | — | — | — | — |
| Other additives (parts by weight) | PX200 | — | — | — | — | — | — | — |
| Kneading temperature ° C. |  | 180 | 180 | 180 | 180 | 180 | 170 | 230 |
| Terminal modification rate % of polylactic acid |  | 89 | 94 | 90 | 85 | 85 | 91 | 95 |
| Flame retardancy test | UL-94 | V-0 (no occurrence of cotton ignition) | V-0 (no occurrence of cotton ignition) | V-0 (no occurrence of cotton ignition) | V-0 (no occurrence of cotton ignition) | V-0 (no occurrence of cotton ignition) | V-0 (no occurrence of cotton ignition) | V-0 (no occurrence of cotton ignition) |
|  | Combustion state | Extinguished immediately after flame rises | No flame rising | No flame rising | No flame rising | No flame rising | Extinguished immediately after flame rises | Extinguished immediately after flame rises |

TABLE 2

|  |  | Example 8 | Example 9 | Example 10 | Example 11 | Example 12 | Example 13 |
|---|---|---|---|---|---|---|---|
| Polylactic acid (parts by weight) | 3001D | 100 | 100 | 100 | 100 | 100 | 100 |
|  | 4032D | — | — | — | — | — | — |
| Reactive organic phosphorus compound (parts by weight) | E100 | — | — | — | — | — | — |
|  | E-10 | — | — | — | — | — | — |
|  | E-1 | — | — | — | — | — | — |
|  | E-8 | — | — | — | — | — | — |
|  | E-3 | — | — | — | — | — | — |
|  | E-4 | — | — | — | — | — | — |
|  | E-6 | 2 | — | 1 | 0.7 | 0.5 | 0.2 |
|  | E-2 | — | 5 | — | — | — | — |
| Other additives (parts by weight) | PX200 | — | — | — | — | — | — |
| Kneading temperature ° C. |  | 180 | 180 | 180 | 180 | 180 | 180 |
| Terminal modification rate % of polylactic acid |  | 85 | 92 | 73 | 65 | 55 | 45 |
| Flame retardancy test | UL-94 | V-0 (no occurrence of cotton ignition) | V-0 (no occurrence of cotton ignition) | V-0 (no occurrence of cotton ignition) | V-0 (no occurrence of cotton ignition) | V-0 (no occurrence of cotton ignition) | V-1 (no occurrence of cotton ignition) |
|  | Combustion state | No flame rising | Extinguished immediately after flame rises | No flame rising | Extinguished immediately after flame rises | Extinguished immediately after flame rises | Combusted over low flame |

TABLE 3-continued

|  | | Comparative Example 1 | Comparative Example 2 |
|---|---|---|---|
| Flame retardancy test | UL-94 | V-2 (Occurrence of cotton ignition) | V-2 (Occurrence of cotton ignition) |
|  | Combustion state | Combusted with flame | Combusted with flame |

From the above-described results, in the present Example, it is found that better results are obtained in the flame retardancy test (and a combustion state thereof), as compared with Comparative Examples.

Furthermore, in Examples 1 to 10, it is found that the terminal modification rate of the polylactic acid is high and improved in terms of the combustion state, as compared with Examples 11 to 13.

Further, with regard to Examples 11 to 13, in Examples 11 and 12, it is found that the terminal modification rate of the polylactic acid is high and improved in terms of the results of the V test in UL-94, as compared with Example 13.

In addition, in Examples 3 and 8, each using a reactive organic phosphorus compound having an aromatic ring structure, the combustion state is improved with the same amount and the same degree of the terminal modification rate, as compared with Example using the reactive organic phosphorus compound having no aromatic ring structure.

Moreover, in Examples 3, 4, and 5, 2 parts by weight of "material name: CARBODILITE LA-1 (manufactured by Nisshinbo Holdings Inc.)" and 2 parts by weight of "material name: STABBAXOL P (manufactured by Rhein-Chemie Rheinau GmbH)" are further added to prepare a resin composition. A resin molded product is obtained using the resin composition, and evaluated, and it is thus confirmed that the same results are obtained.

Further, details on the abbreviations of the respective components shown in Tables 1 to 3 are as follows.

Polylactic Acid
- 30010: manufactured by NatureWorks LLC, weight-average molecular weight of 150000
- 4032D: manufactured by NatureWorks LLC, weight-average molecular weight of 200000

Reactive Organic Phosphorus Compound
- Compound exemplified as a reactive organic phosphorus compound Other Additives
- PX200: manufactured by Daihachi Chemical Industry Co., Ltd., condensed phosphoric ester The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polylactic acid having a terminal-modified structure represented by the following formula (1):

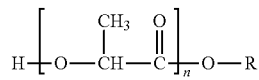

Formula (1)

where in the formula (1),

R represents a residue of an organic phosphorus compound containing an epoxy group, and n represents an integer from 100 to 5000;

wherein the polylactic acid having a terminal-modified structure is a reaction product of a terminal-unmodified polylactic acid and the organic phosphorus compound, an amount of the organic phosphorus compound being 0.2 to 5 parts by weight with respect to the terminal-unmodified polylactic acid.

2. The polylactic acid having a terminal-modified structure according to claim 1, wherein the organic phosphorus compound is selected from a phosphonate compound, a phosphinate compound, a phosphine oxide compound, and a phosphite compound.

3. The polylactic acid having a terminal-modified structure according to claim 1, wherein a terminal modification rate of the polylactic acid is 50% or more.

4. The polylactic acid having a terminal-modified structure according to claim 1, wherein a terminal modification rate of the polylactic acid is 80% or more.

5. The polylactic acid having a terminal-modified structure according to claim 1, wherein n is from 500 to 3000.

6. The polylactic acid having a terminal-modified structure according to claim 1, wherein the organic phosphorus compound has an aromatic ring structure.

7. The polylactic acid having a terminal-modified structure according to claim 2, wherein the organic phosphorus compound is selected from the following formulae:

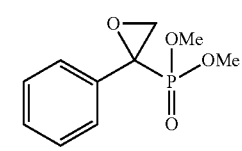

E-1

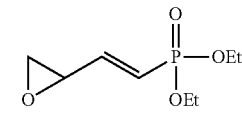

E-2

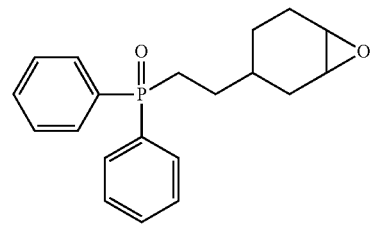

E-3

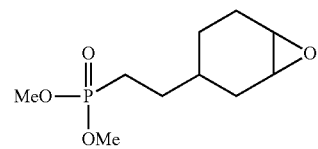

E-4

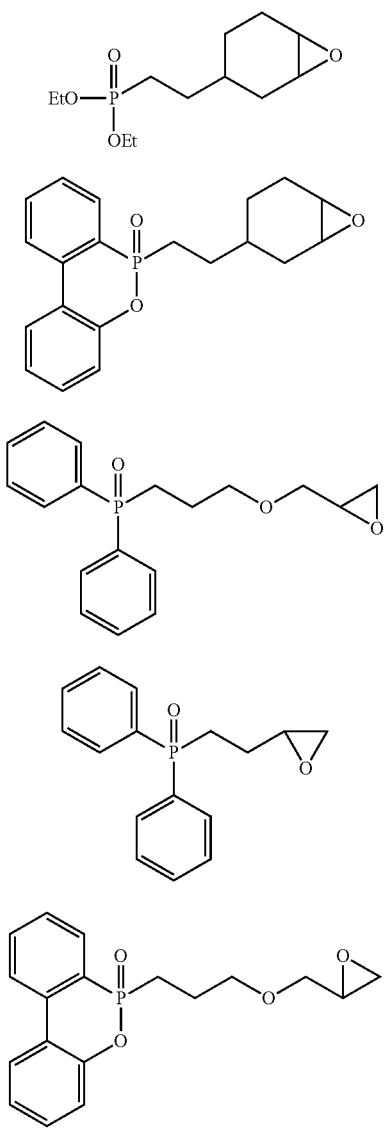

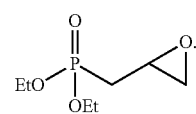

8. A resin composition having the polylactic acid having a terminal-modified structure of claim 1.

9. The resin composition according to claim 8, wherein the organic phosphorus compound is selected from a phosphonate compound, a phosphinate compound, a phosphine oxide compound, and a phosphite compound.

10. The resin composition according to claim 8, wherein a terminal modification rate of the polylactic acid having a terminal-modified structure is 50% or more.

11. The resin composition according to claim 8, wherein the organic phosphorus compound has an aromatic ring structure.

12. A resin molded product having the polylactic acid having a terminal-modified structure of claim 1.

13. The resin molded product according to claim 12, wherein the organic phosphorus compound is selected from a phosphonate compound, a phosphinate compound, a phosphine oxide compound, and a phosphite compound.

14. The resin molded product according to claim 12, wherein a terminal modification rate of the polylactic acid having a terminal-modified structure is 50% or more.

15. The resin molded product according to claim 12, wherein the organic phosphorus compound has an aromatic ring structure.

16. A resin composition comprising a polylactic acid having a terminal-modified structure, and an organic phosphorus compound containing an epoxy group, wherein the polylactic acid having a terminal-modified structure is a reaction product of a terminal-unmodified polylactic acid and the organic phosphorus compound, an amount of the organic phosphorus compound being 0.2 to 5 parts by weight with respect to the terminal-unmodified polylactic acid.

* * * * *